UNITED STATES PATENT OFFICE.

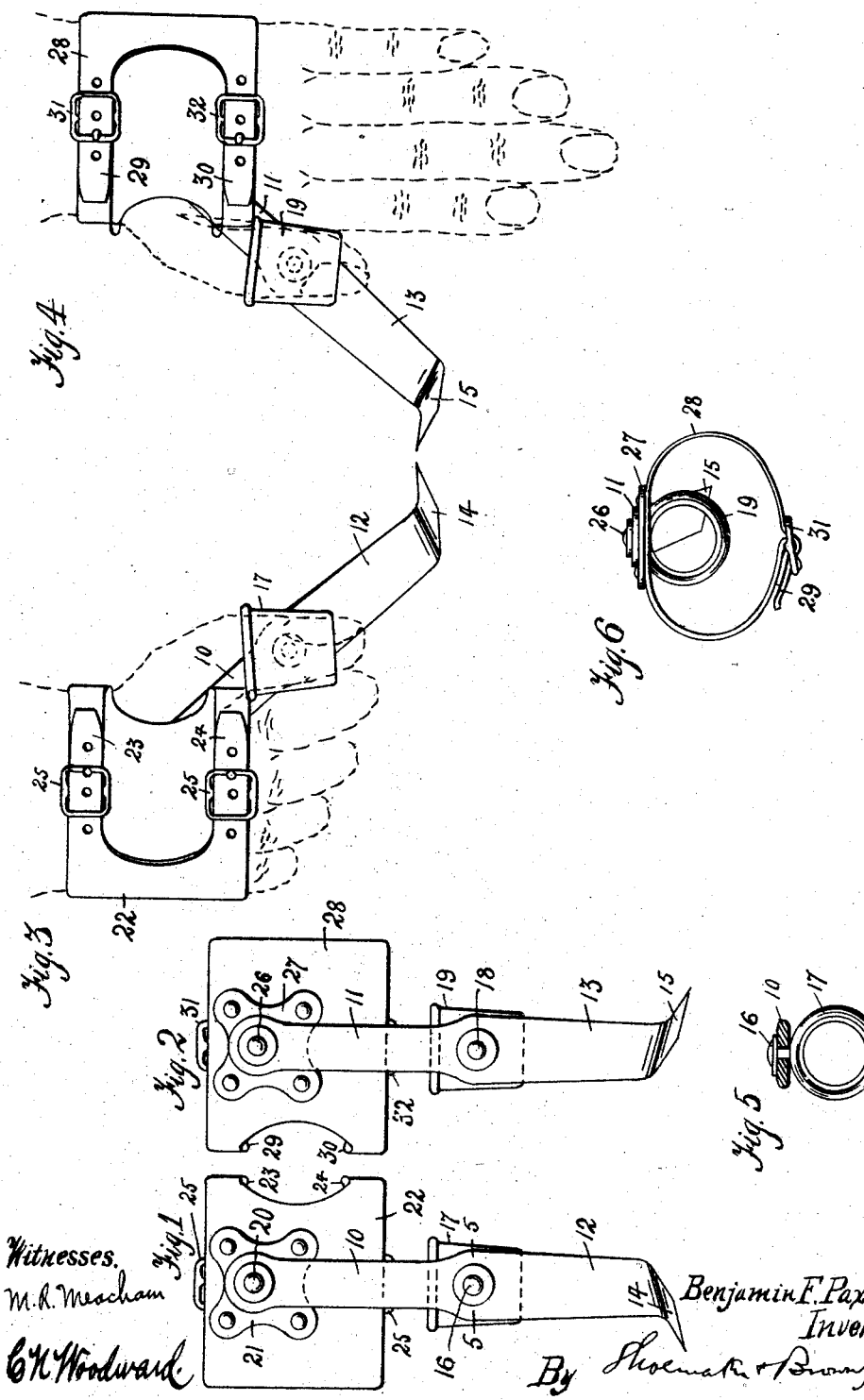

BENJAMIN F. PAXTON, OF VALENTINE, NEBRASKA.

WEEDING DEVICE.

No. 909,018.   Specification of Letters Patent.   Patented Jan. 5, 1909.

Application filed February 15, 1908. Serial No. 416,141.

*To all whom it may concern:*

Be it known that I, BENJAMIN F. PAXTON, a citizen of the United States, residing at Valentine, in the county of Cherry and State of Nebraska, have invented certain new and useful Improvements in Weeding Devices, of which the following is a specification.

This invention relates to devices for destroying weeds, and for like purposes, and which may also be employed to a limited extent for loosening soil around the roots of plants, and has for its object to produce a simply constructed device arranged in oppositely disposed pairs for attachment to the hands of the operator.

With these and other objects in view, the invention consists in a pair of bars arranged right and left and provided with means for connection detachably with the hands of the operator, one pair being employed on each hand, the connection with the hands preferably being made with the thumbs and palms thereof.

The invention further consists in certain novel features of construction as hereafter shown and described and specifically pointed out in the claims, and in the drawings employed for illustrating the invention is shown the preferred embodiment thereof, and in the drawings thus employed, Figures 1 and 2 are side elevations from the outside of the two parts of the improved device. Figs. 3 and 4 are similar views from the inside. Fig. 5 is a section on the line 5—5 of Fig. 1. Fig. 6 is a plan view of the portion of the device shown in Fig. 2 with the knife member and thumb socket in vertical position.

In the drawings illustrative of the invention is shown two bars 10—11 with the lower portions knife edged, as at 12—13 and with the terminals of the knife edged portions bent laterally in opposite directions, as at 14 and 15. Pivoted at 16 to the bar 10 is a thumb socket 17, and pivoted at 18 to the bar 11 is a correspondingly shaped thumb socket 19.

In using the device the operator inserts his thumbs respectively in the sockets 17—19 with the rear ends of the bars 10—11 placed opposite the palms of the hands, the fingers of the hands if required being clasped around the bars rearwardly of the sockets 17—18, leaving the knife edges and laterally bent portions of the bars projecting beyond the fingers of the hands, and in position to be employed for severing the weeds, loosening the soil, pruning small branches, or for similar purposes.

The bar 10 is extended beyond the socket 17 and is pivoted at 20 to a plate 21, the latter being in turn riveted to a hand embracing strap or band 22, the latter divided at its free ends into straps 23—24 adapted to be united by buckles 25 to enable the band 22 to be secured around the hand of the operator.

The bar 11 is extended beyond the socket 19 and secured by a rivet 26 to a plate 27, the latter in turn riveted or otherwise secured to a band 28 similar to the band 22 and provided with straps 29—30 and buckles 31—32 to enable the band to be attached around the hand of the operator.

The cutting portions 12—13—14—15 being arranged right and left, the thumb of one hand will be inserted in the socket 17 and the band 22 attached to the palm of the same hand, while the thumb of the other hand will be inserted in the socket 19 and the palm of the same hand embraced by the band 28, so that the improved device as a whole will be adapted respectively to the right and left hands of the operator.

The sockets 17—19 being swiveled to the bars 10—11, and the bands 22—28 being also swiveled to the bars, the device possesses a certain degree of flexibility and yieldableness to enable the bars to adapt themselves to the movements of the wrists and hands of the operator, so that the implement may be more readily employed in its work.

The device is very simple in construction, and can be adapted to hands of various sizes. The bars 10—11 will be of tempered steel to enable them to withstand the severe strains to which they will be subjected, while the sockets 17 may be of sheet metal, some of the various forms of vulcanite manufactured, or constructed from any suitable material.

From the foregoing it will be understood that either tool may be used alone or that both tools may be used together.

What is claimed is:—

1. An implement of the class described comprising a bar having cutting edges at one end, and a thumb engaging element connected to the bar.

2. An implement of the class described comprising a bar having a cutting edge at one end, and a thumb engaging element movably connected to the bar.

3. An implement of the class described comprising a bar having cutting edges at one end and a thumb engaging element swiveled to the bar.

4. An implement of the class described comprising a bar having cutting edges at one end and with a cutting portion formed with a laterally extending terminal, and with a thumb engaging element swiveled to the bar.

5. An implement of the class described comprising a bar having cutting edges at one end and a socket for the thumb of the operator connected to the bar.

6. An implement of the class described comprising a bar having cutting edges at one end and a socket for the thumb of the operator swiveled to the bar.

7. An implement of the class described comprising a bar having cutting edges at one end, a hand engaging device at the other end of the bar, and a thumb engaging device connected to the bar intermediate its ends.

8. An implement of the class described comprising a bar having cutting edges at one end, a hand engaging device at the other end of the bar, and a thumb engaging device swiveled to the bar intermediate its ends.

9. An implement of the class described comprising a bar having cutting edges at one end, a hand engaging device swiveled at the other end of the bar, and a thumb engaging device connected to the bar intermediate the ends thereof.

10. An implement of the class described comprising a bar having cutting edges at one end, a hand embracing element, means for swiveling the bar at the other end to said hand engaging element, and a thumb engaging device connected to the bar intermediate its ends.

11. An implement of the class described comprising a bar having cutting edges at one end, a hand engaging device, a plate connected to said hand engaging device, means for swiveling said plate to the bar at its other end, and a thumb engaging device connected to the bar intermediate its ends.

12. An implement of the class described comprising a bar having cutting edges at one end, a hand embracing device, a plate connected to said hand embracing device, means for swiveling said plate to said bar at its other end, and a thumb receiving socket swiveled to said bar intermediate its ends.

In testimony whereof I affix my signature, in presence of two witnesses.

BENJAMIN F. PAXTON.

Witnesses:
ANDREW B. BOUISSEY,
EVANGELINE GASKILL.